United States Patent
Fujita

(10) Patent No.: US 12,509,786 B2
(45) Date of Patent: Dec. 30, 2025

(54) METHOD OF DETECTING SHORT CIRCUIT IN WATER ELECTROLYZER, METHOD OF GENERATING HYDROGEN, AND WATER ELECTROLYZER

(71) Applicant: TOYOTA JIDOSHA KABUSHIKI KAISHA, Toyota (JP)

(72) Inventor: Keisuke Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 595 days.

(21) Appl. No.: 18/054,756

(22) Filed: Nov. 11, 2022

(65) Prior Publication Data

US 2023/0193490 A1 Jun. 22, 2023

(30) Foreign Application Priority Data

Dec. 20, 2021 (JP) ................. 2021-206003

(51) Int. Cl.
| | | |
|---|---|---|
| *C25B 15/023* | (2021.01) | |
| *C25B 1/04* | (2021.01) | |
| *C25B 9/70* | (2021.01) | |
| *G01R 31/52* | (2020.01) | |

(52) U.S. Cl.
CPC .............. *C25B 15/023* (2021.01); *C25B 1/04* (2013.01); *C25B 9/70* (2021.01); *G01R 31/52* (2020.01)

(58) Field of Classification Search
CPC ......... C25B 1/04; C25B 15/023; C25B 15/06; G01R 31/52
See application file for complete search history.

(56) References Cited

U.S. PATENT DOCUMENTS

| | | | |
|---|---|---|---|
| 4,212,721 A | 7/1980 | Bergner et al. | |
| 2004/0245100 A1 | 12/2004 | Abouatallah | |
| 2021/0222309 A1* | 7/2021 | Berriah | ..................... C25B 1/34 |

FOREIGN PATENT DOCUMENTS

| | | | | |
|---|---|---|---|---|
| CN | 208949425 U | | 6/2019 | |
| CN | 113388861 A | * | 9/2021 | ............ G01R 31/52 |
| DE | 2729732 A1 | | 1/1979 | |
| DE | 202021101046 U1 | | 3/2021 | |
| JP | S5130009 B1 | | 8/1976 | |
| JP | H07243079 A | | 9/1995 | |
| JP | 2020196906 A | | 12/2020 | |
| KR | 20130130504 A | | 12/2013 | |

* cited by examiner

*Primary Examiner* — Alexander W Keeling
(74) *Attorney, Agent, or Firm* — Hunton Andrews Kurth LLP

(57) ABSTRACT

To make it possible to detect a short circuit in a water electrolyzer even while the water electrolyzer is operating, a voltage sensor is disposed for each of plural water electrolytic cells, the voltage of each of the water electrolytic cells is measured with the voltage sensor while the water electrolyzer is operating, and it is determined that there is a short circuit if it is detected that the voltage is lower than a reference voltage.

4 Claims, 7 Drawing Sheets

METHOD OF DETECTING SHORT CIRCUIT IN WATER ELECTROLYZER, METHOD OF GENERATING HYDROGEN, AND WATER ELECTROLYZER

CROSS-REFERENCE TO RELATED APPLICATION

This application claims priority to Japanese Patent Application No. 2021-206003 filed on Dec. 20, 2021, which is incorporated herein by reference in its entirety.

FIELD

The present disclosure relates to short circuit detection in a water electrolyzer.

BACKGROUND

Patent Literature 1 discloses a program for detecting a short circuit in a stack in a stopped state: specifically, the cell resistance R is obtained from the current value I when the voltage V is applied using an auxiliary power supply, and a determination is made depending on whether R is under a threshold value or not.

CITATION LIST

Patent Literature

Patent Literature 1: JP 2020-196906 A

SUMMARY

Technical Problem

According to the conventional art, a short circuit cannot be detected while a water electrolyzer is operating; that is, only an anomaly in the stopped state can be detected since the voltage is applied to the stack in the stopped state using the auxiliary power supply.

An object of the present disclosure is to make it possible to detect a short circuit in a water electrolyzer even while the water electrolyzer is operating.

Solution to Problem

The present application discloses a method of detecting a short circuit in plural water electrolytic cells that are put in a water electrolyzer, the method comprising: disposing a voltage sensor for each of the water electrolytic cells, measuring a voltage of each of the water electrolytic cells with the voltage sensor while the water electrolyzer is operating, and determining that there is a short circuit if it is detected that the voltage is lower than a reference voltage.

For short circuit detection, a current density may be reduced to be lower than a stationary current density for water electrolysis, to determine whether there is a short circuit or not.

The present application also discloses a method of detecting a short circuit in plural water electrolytic cells that are put in a water electrolyzer, the method comprising: disposing a voltage sensor for every n of the water electrolytic cells, measuring a voltage of the n water electrolytic cells with the voltage sensor while the water electrolyzer is operating, and determining that there is a short circuit if the detected voltage is lower than $(n-1)V_m+V_b$ when a stationary voltage for water electrolysis is $V_m$ and a reference voltage is $V_b$.

The present application also discloses a method of generating hydrogen, the method comprising: detecting a short circuit according to the above-described method while generating hydrogen with the water electrolyzer.

The present application also discloses a water electrolyzer adapted to electrolyze water with a water electrolytic cell to obtain hydrogen, the water electrolyzer comprising: plural water electrolytic cells; voltage sensors provided for the respective water electrolytic cells; and a controller that obtains voltages from the voltage sensors, wherein the controller informs that there is a short circuit if any of the voltages obtained while hydrogen is generated with the water electrolytic cells is lower than a reference voltage.

For detecting a short circuit, the controller may periodically reduce a current density to be lower than a current density at a stationary voltage for water electrolysis, to obtain the voltages.

The present application also discloses a water electrolyzer adapted to electrolyze water with a water electrolytic cell to obtain hydrogen, the water electrolyzer comprising: plural water electrolytic cells; a voltage sensor provided for every n of the water electrolytic cells; and a controller that obtains a voltage from the voltage sensor, wherein the controller measures the voltage of said every n water electrolytic cells with the voltage sensor while the water electrolyzer is operating, and informs that there is a short circuit if the detected voltage of said every n water electrolytic cells is lower than $(n-1)V_m+V_b$ when a stationary voltage for water electrolysis is $V_m$ and a reference voltage is $V_b$.

Advantageous Effects

According to the present disclosure, a short circuit can be constantly detected even while a water electrolyzer is operating, and can be found at an early stage.

DESCRIPTION OF EMBODIMENTS

1. Water Electrolyzer

Figure 1:
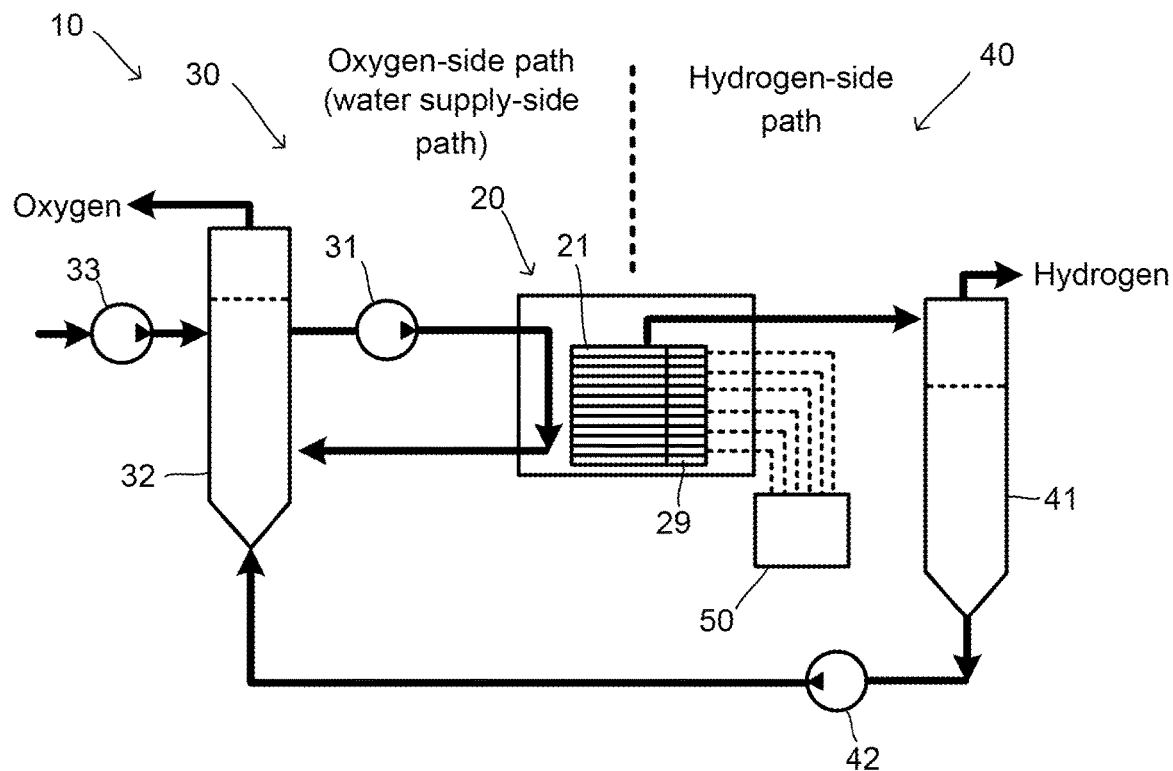
FIG. 1 is a schematic view illustrating structure of a water electrolyzer 10.

FIG. 1 schematically shows a water electrolyzer 10 according to one embodiment.

In this embodiment, the water electrolyzer 10 has a water electrolytic stack 20, an oxygen-side path 30, a hydrogen-side path 40, and a controller 50. In the water electrolyzer 10, electrification is made in a state where pure water is supplied from the oxygen-side path 30 to water electrolytic cells 21 which are provided in the water electrolytic stack 20, to resolve the water into hydrogen and oxygen. The obtained hydrogen is separated out in the hydrogen-side path 40.

1.1. Water Electrolytic Stack, Water Electrolytic Cells, and Sensors

Figure 2:
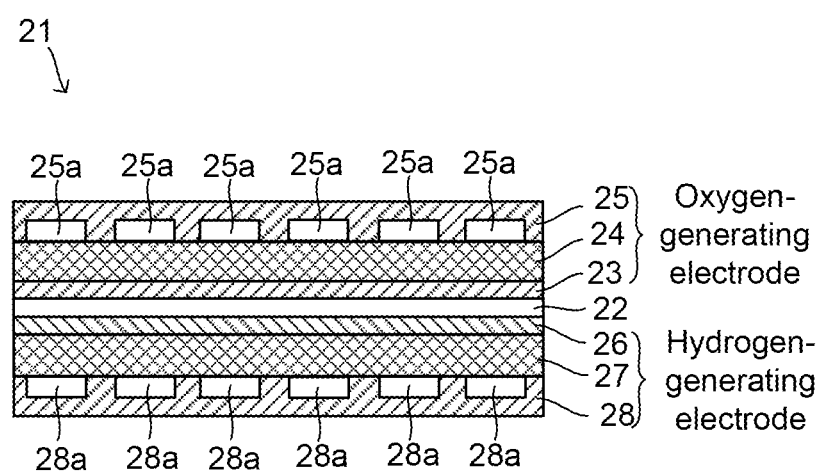
FIG. 2 is a schematic view illustrating structure of a water electrolytic cell 21.

FIG. 2 schematically shows a mode of one of the water electrolytic cells 21. The water electrolytic cell 21 is a unit element for resolving pure water into hydrogen and oxygen. A plurality of such water electrolytic cells 21 are stacked and put in the water electrolytic stack 20.

The water electrolytic cell 21 is as known. In this embodiment, the water electrolytic cell 21 is formed of plural layers. Across a solid polymer electrolyte membrane 22, one side of the water electrolytic cell 21 is an oxygen-generating electrode (anode), and the other side thereof is a hydrogen-generating electrode (cathode).

The material constituting the solid polymer electrolyte membrane 22 is a solid polymer material, and an example thereof is a proton conductive ion exchange membrane that is formed from a fluorine-based resin, a hydrocarbon-based resin material, or the like. This exhibits excellent proton conductivity (electric conductivity) in a wet state. A more specific example is Nafion (registered trademark), which is a perfluorosulfonic acid membrane.

The oxygen-generating electrode (anode) is provided with an oxygen electrode catalyst layer 23, an oxygen electrode gas diffusion layer 24, and an oxygen electrode separator 25 in this order from the solid polymer electrolyte membrane 22 side.

The oxygen electrode catalyst layer 23 is a layer that is formed from an electrode catalyst containing at least one of precious metal catalysts such as Pt, Ru and Ir, and oxides thereof.

The oxygen electrode gas diffusion layer 24 is formed of an electroconductive member having gas permeability. A specific example of such a member is a porous electroconductive member formed from a metal fiber or a metal particle.

The oxygen electrode separator 25 is a member provided with flow paths 25a where pure water to be supplied to the oxygen electrode gas diffusion layer 24, and obtained oxygen flow.

The hydrogen-generating electrode (cathode) is provided on a surface of the solid polymer electrolyte membrane 22 which is on the opposite side of a surface thereof where the oxygen-generating electrode is arranged. The hydrogen-generating electrode is provided with a hydrogen electrode catalyst layer 26, a hydrogen electrode gas diffusion layer 27, and a hydrogen electrode separator 28 in this order from the solid polymer electrolyte membrane 22 side.

An example of the hydrogen electrode catalyst layer 26 is a layer containing Pt etc.

The hydrogen electrode gas diffusion layer 27 is formed of an electroconductive member having gas permeability. A specific example of such a member is a porous member such as a carbon cloth and a carbon paper.

The hydrogen electrode separator 28 is a member provided with flow paths 28a where separated hydrogen and attending water flow.

An electric current is passed between the oxygen-generating electrode and the hydrogen-generating electrode, and thereby, pure water ($H_2O$) supplied via the flow paths 25a of the oxygen electrode separator 25 to the oxygen-generating electrode is resolved in the oxygen electrode catalyst layer 23, which has electric potential then, into oxygen, electrons, and protons ($H^+$). At this time, the protons pass through the solid polymer electrolyte membrane 22 to move to the hydrogen electrode catalyst layer 26. The electrons separated out in the oxygen electrode catalyst layer 23 pass through an external circuit to reach the hydrogen electrode catalyst layer 26. The protons receive the electrons in the hydrogen electrode catalyst layer 26, so that hydrogen is generated. The generated hydrogen reaches the hydrogen electrode separator 28, is discharged via the flow paths 28a, and moves to the hydrogen-side path 40. The oxygen separated out in the oxygen electrode catalyst layer 23 reaches the oxygen electrode separator 25, is discharged via the flow path 25a, and moves to the oxygen-side path 30.

The water electrolytic stack 20 is configured so that the voltage of each of the plural water electrolytic cells 21 put therein can be measured. The configuration is not specifically limited in particular as long as the voltage of each of the plural water electrolytic cells 21 can be measured, but an example thereof is to arrange a sensor (voltage sensor) 29 for each of the water electrolytic cells 21 as the present embodiment. As described later, the controller 50 processes a determination whether there is a short circuit or not based on the voltage values obtained from the respective water electrolytic cells 21.

While water is electrolyzed (hydrogen is generated), each of the water electrolytic cells 21 operate with a stationary current density $J_m$ (A/cm$^2$) at a stationary voltage $V_m$ (V) when normal (when there is no short circuit), whereas operating at a lower voltage than the stationary voltage even with the same current density when there is a short circuit.

1.2. Oxygen-Side Path (Water Supply-Side Path)

The oxygen-side path (water supply-side path) 30 is a path via which pure water is supplied to the water electrolytic cells 21 of the water electrolytic stack 20, via which oxygen is obtained, and which includes piping. Via the oxygen-side path 30, pure water is supplied to the water electrolytic stack 20 from a pump 31, and generated oxygen and unused water are discharged from the water electrolytic stack 20, and are supplied to a gas-liquid separator 32. In the gas-liquid separator 32, pure water and oxygen are separated. The separated oxygen is discharged; and the pure water is supplied again to the pump 31. Pure water is supplied from a pump 33 to the gas-liquid separator 32 when running short. These instruments are connected by the piping.

1.3. Hydrogen-Side Path

The hydrogen-side path 40 is a path including piping via which hydrogen separated out in the water electrolytic stack 20 is taken out. Via the hydrogen-side path 40, hydrogen and water (pure water) discharged from the water electrolytic cells 21 of the water electrolytic stack 20 are supplied to a gas-liquid separator 41. In the gas-liquid separator 41, water and hydrogen are separated. The separated hydrogen is collected; and the water is sent to the gas-liquid separator 32 in the oxygen-side path 30 with a pump 42, and is utilized again. These instruments are connected by the piping.

1.4. Controller

Figure 3:
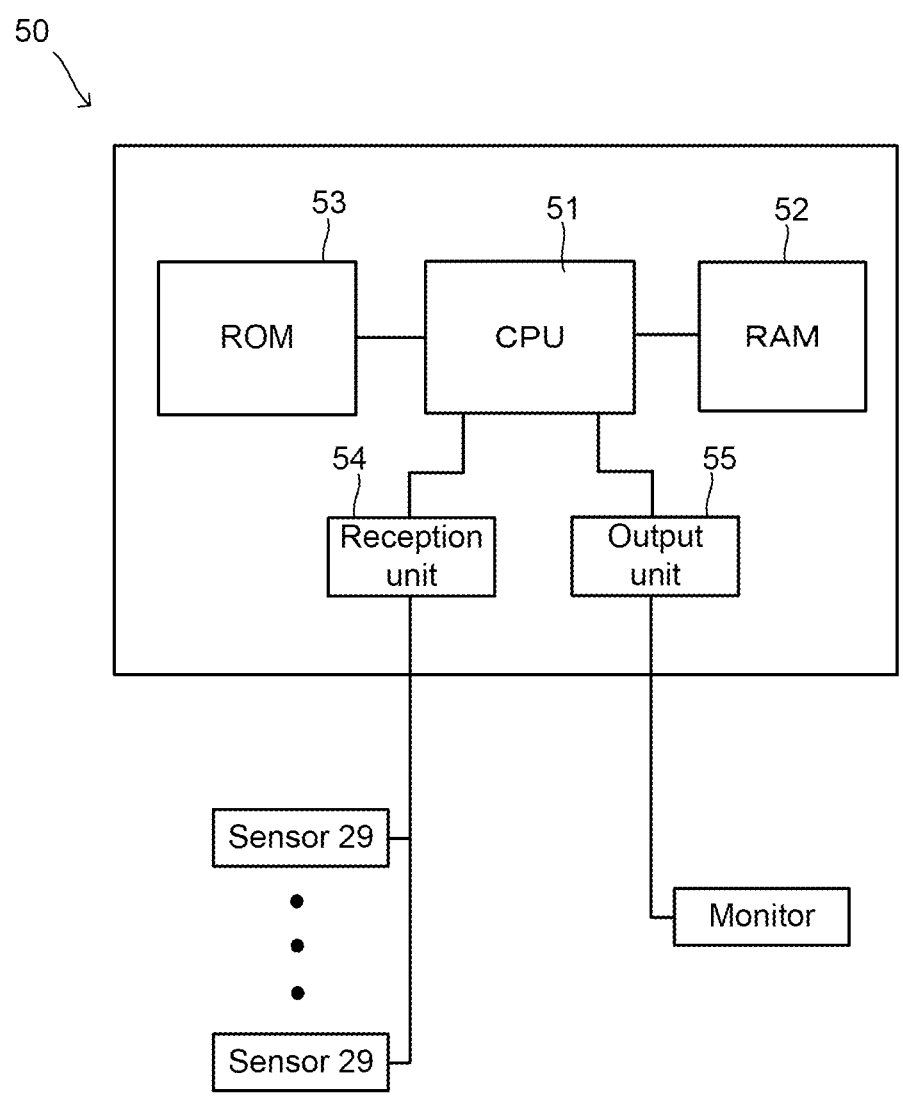
FIG. 3 is a schematic view of a computer 50 (controller 50)

The controller 50 is a controller for carrying out, in the water electrolyzer 10, a method of detecting a short circuit in a water electrolyzer according to the present disclosure. The mode of the controller 50 is not particularly limited, but the controller 50 can be typically configured by a computer. FIG. 3 schematically shows an example of the configuration of a computer 50 as the controller 50.

The computer 50 is provided with a CPU (Central Processing Unit) 51 that is a processor, a RAM (Random Access Memory) 52 that operates as a work area, a ROM (Read-Only Memory) 53 as a storage medium, a reception unit 54 that is an interface for the computer 50 to receive both wired and wireless information, and an output unit 55 that is an interface for the computer 50 to transmit both wired and wireless information to the outside.

The sensors 29 provided in the water electrolytic stack 20 are each electrically connected to the reception unit 54, so that the reception unit 54 can receive the value (voltage) indicated by each of the sensors as a signal.

A monitor is connected to the output unit 55 so as to display the results of the determination whether there is a short circuit or not.

A computer program for executing the steps of the method of detecting a short circuit in a water electrolyzer according to the present disclosure is stored in the computer 50 as specific instructions. In the computer 50, the CPU 51, the RAM 52, and the ROM 53 as hardware resources cooperate with the computer program. Specifically, the CPU 51 executes, in the RAM 52, which operates as a work area, the computer program recorded in the ROM 53 based on the signals from the sensors 29, which are obtained via the reception unit 54 and represent the voltages, and thereby, implements the operation. The information obtained or created by the CPU 51 is stored in the RAM 52. The presence or not of a short circuit is displayed on the monitor via the output unit 55 as necessary based on the steps of the method of detecting a short circuit in a water electrolyzer according to the present disclosure.

Next, the method of detecting a short circuit in a water electrolyzer according to the present disclosure will be specifically described.

2. Method of Detecting Short Circuit in Water Electrolyzer (First Embodiment)

Figure 4:
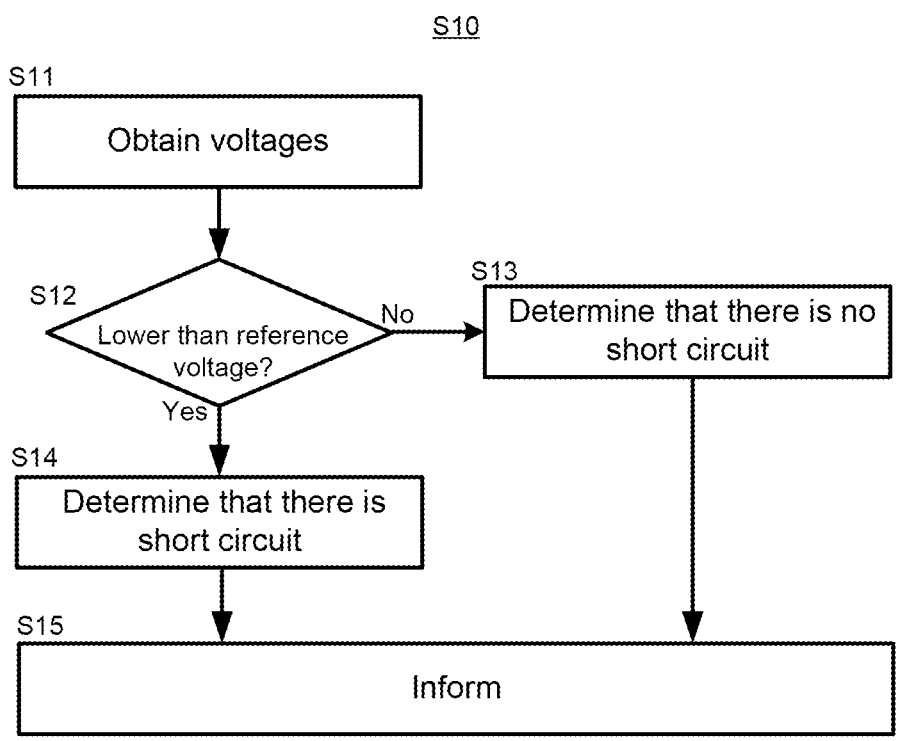
FIG. 4 shows a flow of a method S10 of detecting a short circuit in a water electrolyzer.

FIG. 4 shows the flow of a method S10 of detecting a short circuit in a water electrolyzer according to the first embodiment of the present disclosure (which may be hereinafter described as "detection method S10"). As seen in FIG. 4, the detection method S10 includes the steps S11 to S15. The above-described computer program stored in the controller 50 includes specific instructions for the computer to execute each of the steps in this detection method S10.

2.1. Step S11

Figure 5:
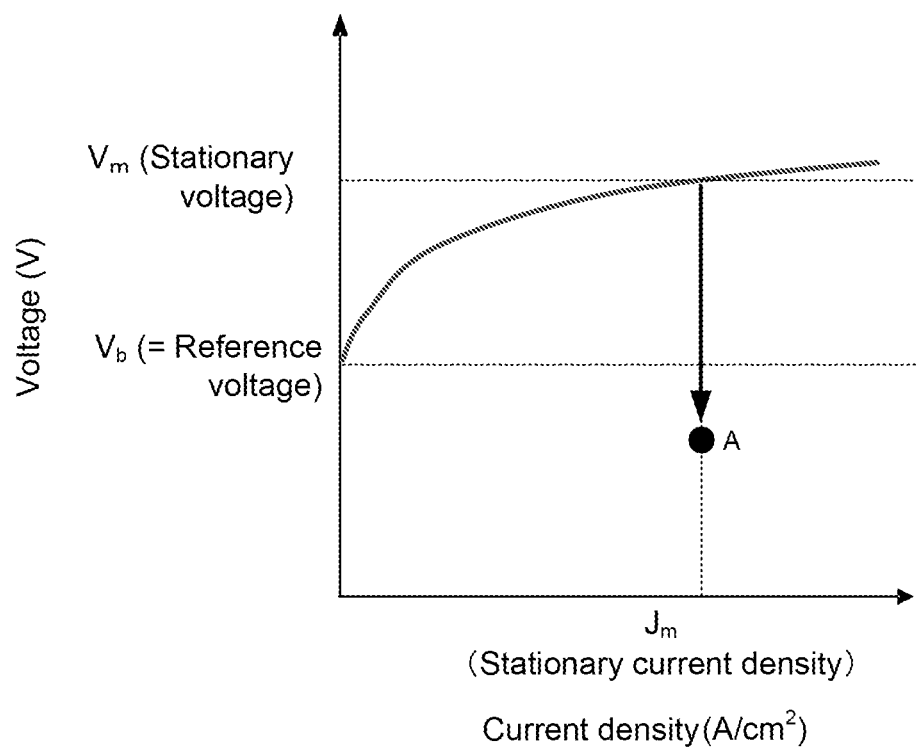
FIG. 5 illustrates the method S10.

In the step S11, the voltages of the water electrolytic cells 21 are obtained from the sensors 29 provided in the respective water electrolytic cells 21 while water is resolved. At this time, the water electrolytic cells are each with a stationary current density $J_m$ (A/cm$^2$) as shown in FIG. 5.

2.2. Steps S12, S13, and S14

In the step S12, it is determined for each of the plural water electrolytic cells 21 whether the voltage is lower than a reference voltage $V_b$. As shown in FIG. 5, when the current density is the stationary current density $J_m$ (A/cm$^2$), the voltage is ordinarily (when there is no short circuit) a stationary voltage $V_m$ (V), whereas the voltage is lower than the reference voltage $V_b$ (point A) when there is a short circuit. Here, the magnitude of the reference voltage $V_b$ is not specifically limited in particular, but may be, for example, 1.48 (V).

In the step S12, if the voltage is at least the reference voltage $V_b$, No is selected, and the method proceeds to the step S13. In the step S13, it is determined for each of the water electrolytic cells 21 that there is no short circuit.

In the step S12, if the voltage is lower than the reference voltage $V_b$, Yes is selected, and the method proceeds to the step S14. In the step S14, it is determined for each of the water electrolytic cells 21 that there is a short circuit.

2.3. Step S15

In the step S15, the determination result in the step S13 or S14 is informed by a display on the monitor or the like. In addition to the presence or not of a short circuit, the position of a water electrolytic cell 21 that is a subject of this determination (for example, the position where this cell is stacked in the plural stacked water electrolytic cells 21) may be also displayed.

2.4. Effect Etc.

According to the detection method S10 of this embodiment, a short circuit can be detected while hydrogen is generated by ordinary water electrolysis, which makes it possible to constantly know the presence or not of a short circuit. In addition, the frequency of the use of the monitor can be reduced, to achieve compactness and a lower cost.

In the above description, one voltage is obtained from one water electrolytic cell. The present disclosure is not limited to this. For example, one voltage may be obtained from two water electrolytic cells in combination, or one voltage may be obtained from three or more (n) water electrolytic cells in combination. At this time, in the step S12, it can be determined that there is a short circuit in any of n water electrolytic cells if the detected voltage is lower than $(n-1) \cdot V_m + V_b$, instead of the determination criterion such that the detected voltage is lower than the reference voltage $V_b$. The smaller n is, the more preferable because a water electrolytic cell where there is a short circuit is easily identified.

3. Method of Detecting Short Circuit in Water Electrolyzer (Second Embodiment)

Figure 6:
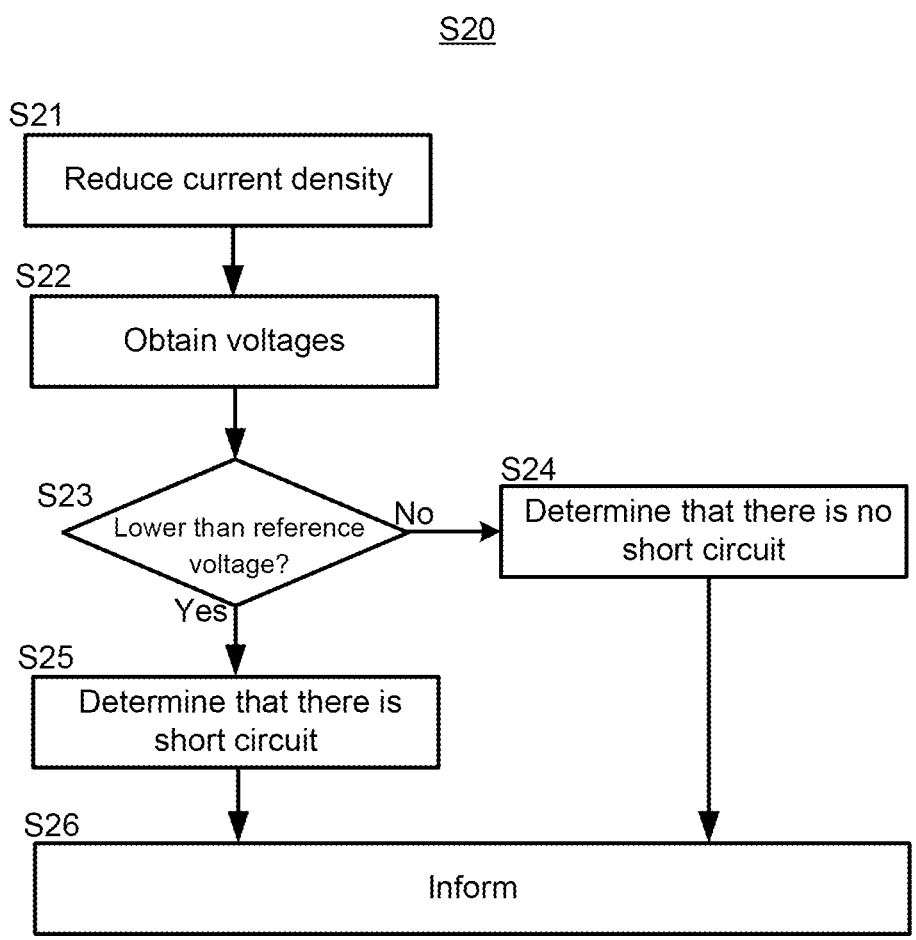
FIG. 6 shows a flow of a method S20 of detecting a short circuit in a water electrolyzer.

FIG. 6 shows a flow of a method S20 of detecting a short circuit in a water electrolyzer according to the second embodiment of the present disclosure (which may be hereinafter described as "detection method S20"). As seen in FIG. 6, the detection method S20 includes the steps S21 to S26. The above-described computer program stored in the controller 50 includes specific instructions for the computer to execute each of the steps in this detection method S20.

3.1. Step S21

Figure 7:
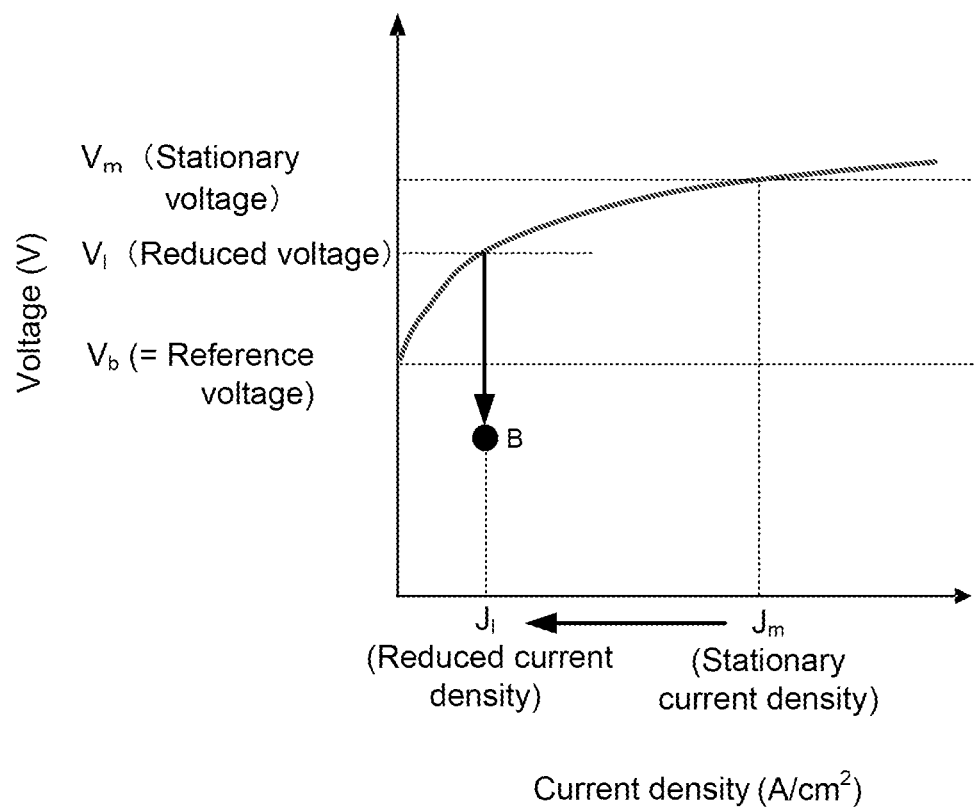
FIG. 7 illustrates the method S20.

In the step S21, the current density is reduced from $J_m$ to $J_l$ (reduced current density $J_l$ (A/cm$^2$)) as shown in FIG. 7 while water is resolved. Reducing the current density also causes the detected voltage to reduce. Thus, the current density is reduced so that the detected voltage would not be lower than the reference voltage $V_b$. The magnitude of the reduced current density $J_l$ is not specifically limited in particular, but may be, for example, 0.1 (A/cm$^2$).

3.2. Step S22

In the step S22, the voltages of the water electrolytic cells 21 are obtained from the sensors 29 provided in the respective water electrolytic cells 21 while water is resolved. At this time, the water electrolytic cells are each with the reduced current density $J_1$ (A/cm$^2$) as shown in FIG. 7 in the step S21.

3.3. Steps S23, S24, and S25

In the step S23, it is determined for each of the plural water electrolytic cells 21 whether the voltage is lower than the reference voltage $V_b$. As shown in FIG. 7, when the current density is the reduced current density $J_l$ (A/cm$^2$), the voltage is ordinarily (when there is no short circuit) a reduced voltage $V_l$ (V), whereas the voltage is lower than the reference voltage $V_b$ (point B) when there is a short circuit. Here, the magnitude of the reference voltage $V_b$ is not specifically limited in particular, but may be, for example, 1.48 (V).

In the step S23, if the voltage is at least the reference voltage $V_b$, No is selected, and the method proceeds to the step S24. In the step S24, it is determined for each of the water electrolytic cells 21 that there is no short circuit.

In the step S23, if the voltage is lower than the reference voltage $V_b$, Yes is selected, and the method proceeds to the step S25. In the step S25, it is determined for each of the water electrolytic cells 21 that there is a short circuit.

3.4. Step S26

In the step S26, the determination result in the step S24 or S25 is informed by a display on the monitor or the like. In addition to the presence or not of a short circuit, the position of a water electrolytic cell 21 that is a subject of this determination (for example, the position where this cell is stacked in the plural stacked water electrolytic cells 21) may be also displayed.

3.5. Effect Etc.

According to the detection method S20 of the present embodiment, a short circuit can be detected while water is electrolyzed although the amount of generated hydrogen is smaller than that for ordinary water electrolysis, which makes it possible to constantly know the presence or not of a short circuit. At this time, as seen from the comparison of FIGS. 5 and 7, the difference between the detected voltage when there is no short circuit ($V_m$ in FIG. 5 according to the detection method S10, $V_l$ in FIG. 7 according to the detection method S20) and the reference voltage $V_b$ is smaller according to the detection method S20 than that according to the detection method S10. As understood from this, according to the detection method S20, the voltage reduces more slightly to reach the reference voltage $V_b$ than the detection method S10, and thus, the accuracy of the detection becomes higher, and a short circuit can be detected at an earlier stage.

Hydrogen can be generated by periodic short circuit detection according to the detection method S20 in ordinary hydrogen generation.

REFERENCE SIGNS LIST

10 water electrolyzer
20 water electrolytic stack
21 water electrolytic cell
29 sensor (voltage sensor)
30 oxygen-side path (water supply-side path)
40 hydrogen-side path
50 controller

What is claimed is:

1. A method of detecting a short circuit in plural water electrolytic cells that are put in a water electrolyzer, the method comprising:
   reducing a current density from a stationary current density for water electrolysis;
   disposing a voltage sensor for each of the water electrolytic cells, measuring a voltage of each of the water electrolytic cells at the reduced current density with the voltage sensor while the water electrolyzer is operating, and determining that there is a short circuit if it is detected that the voltage is lower than a reference voltage.

2. A method of detecting a short circuit in plural water electrolytic cells that are put in a water electrolyzer, the method comprising:
   disposing a voltage sensor for every n of the water electrolytic cells, measuring a voltage of the n water electrolytic cells with the voltage sensor while the water electrolyzer is operating, and determining that there is a short circuit if the detected voltage is lower than $(n-_1)Vm+Vb$ when a stationary voltage for water electrolysis is Vm and a reference voltage is Vb.

3. A method of generating hydrogen, the method comprising:
   detecting a short circuit according to the method defined in claim 1 while generating hydrogen with the water electrolyzer.

4. A water electrolyzer adapted to electrolyze water with a water electrolytic cell to obtain hydrogen, the water electrolyzer comprising:
   plural water electrolytic cells;
   voltage sensors provided for the respective water electrolytic cells; and
   a controller that obtains voltages from the voltage sensors, wherein
   the controller informs that there is a short circuit if any of the voltages obtained while hydrogen is generated with the water electrolytic cells is lower than a reference voltage, and
   for detecting a short circuit, the controller periodically reduces a current density to be lower than a current density at a stationary voltage for water electrolysis, to obtain the voltages.

\* \* \* \* \*